US010209949B2

(12) United States Patent
Dogrultan

(10) Patent No.: US 10,209,949 B2
(45) Date of Patent: Feb. 19, 2019

(54) AUTOMATED VEHICLE OPERATOR STRESS REDUCTION

(71) Applicant: Google Inc., Mountain View, CA (US)

(72) Inventor: Ertan Dogrultan, Belmont, CA (US)

(73) Assignee: Google LLC, Mountain View, CA (US)

( * ) Notice: Subject to any disclaimer, the term of this patent is extended or adjusted under 35 U.S.C. 154(b) by 191 days.

(21) Appl. No.: 15/244,970

(22) Filed: Aug. 23, 2016

(65) Prior Publication Data
US 2018/0060020 A1 Mar. 1, 2018

(51) Int. Cl.
G06F 3/16 (2006.01)
G10L 15/22 (2006.01)

(52) U.S. Cl.
CPC .............. G06F 3/165 (2013.01); G10L 15/22 (2013.01); G10L 2015/228 (2013.01)

(58) Field of Classification Search
CPC .... G06F 3/165; G10L 15/22; G10L 2015/228
See application file for complete search history.

(56) References Cited

U.S. PATENT DOCUMENTS

| 5,314,371 A * | 5/1994 | Mason ..................... A63H 5/00 446/397 |
| 8,400,332 B2 * | 3/2013 | Szwabowski ....... B60R 16/0373 340/425.5 |
| 9,672,823 B2 * | 6/2017 | Penilla .................... G10L 15/22 |
| 2007/0124027 A1 * | 5/2007 | Betzitza ................ B60W 40/02 701/1 |
| 2008/0291032 A1 * | 11/2008 | Prokhorov ........... B60K 28/066 340/576 |
| 2010/0028210 A1 * | 2/2010 | Ozaki .................. B60K 28/063 422/84 |
| 2010/0030434 A1 * | 2/2010 | Okabe .................... A61B 5/165 701/48 |
| 2010/0052946 A1 * | 3/2010 | Levine ................... G08G 1/143 340/932.2 |

(Continued)

FOREIGN PATENT DOCUMENTS

| KR | 2014-0077032 A | 6/2014 |
| KR | 2015-0094670 A | 8/2015 |
| KR | 10-1601957 B1 | 3/2016 |

OTHER PUBLICATIONS

International Search Report and Written Opinion of International Application No. PCT/US2017/047615, dated Oct. 30, 2017, 13 pp.

(Continued)

Primary Examiner — Courtney D Heinle
(74) Attorney, Agent, or Firm — Shumaker & Sieffert, P.A.

(57) ABSTRACT

In one example, a method includes determining, by one or more processors of a computing system included in a vehicle, whether one or more events have occurred that are likely to increase a stress level of an operator of the vehicle, and determining, by the one or more processors, whether the operator is the only person in the vehicle. In this example, the method includes, responsive to determining that one or more events have occurred that are likely to increase the stress level of the operator of the vehicle and that the operator is the only person in the vehicle, outputting, by the one or more processors and for playback by one or more output devices included in the vehicle, media data likely to reduce the stress level of the operator.

20 Claims, 4 Drawing Sheets

(56) References Cited

U.S. PATENT DOCUMENTS

| | | | | |
|---|---|---|---|---|
| 2013/0070043 A1* | 3/2013 | Geva | ................... | B60K 28/066 |
| | | | | 348/14.02 |
| 2014/0135598 A1* | 5/2014 | Weidl | .................. | A61B 5/0205 |
| | | | | 600/301 |
| 2014/0172910 A1* | 6/2014 | Jung | ................ | G06F 17/30749 |
| | | | | 707/769 |
| 2014/0218187 A1* | 8/2014 | Chun | ................... | G08B 21/06 |
| | | | | 340/439 |
| 2015/0081196 A1* | 3/2015 | Petty | ................... | G08G 1/0133 |
| | | | | 701/118 |
| 2016/0212522 A1* | 7/2016 | Lee | ...................... | B60W 50/14 |

OTHER PUBLICATIONS

Huang et al., "TeenChat: A Chatterbot System for Sensing and Releasing Adolescents' Stress", vol. 9085 of the series Lecture Notes in Computer Science, pp. 133-145, May 6, 2015 (13 pgs).

\* cited by examiner

AUTOMATED VEHICLE OPERATOR STRESS REDUCTION

BACKGROUND

Operating a vehicle, such as an automobile, may be stressful for the operator. However, operators with elevated stress levels may drive more aggressively, make mistakes, have reduced happiness, and/or have a reduced lifespan. While self-driving vehicles may reduce or eliminate vehicle operational stress, widespread adoption of self-driving vehicles is still a long way off. Some psychological techniques, such as meditation, may generally reduce stress levels but may not be safe to perform while operating a vehicle.

SUMMARY

In one example, a method includes determining, by one or more processors of a computing system included in a vehicle, whether one or more events have occurred that are likely to increase a stress level of an operator of the vehicle, and determining, by the one or more processors, whether the operator is the only person in the vehicle. In this example, the method includes, responsive to determining that one or more events have occurred that are likely to increase the stress level of the operator of the vehicle and that the operator is the only person in the vehicle, outputting, by the one or more processors and for playback by one or more output devices included in the vehicle, media data likely to reduce the stress level of the operator.

In another example, a vehicle computing system includes one or more audio output components; and one or more processors. In this example, the one or more processors are configured to determine whether one or more events have occurred that are likely to increase a stress level of an operator of a vehicle that includes the vehicle computing system; determine whether the operator is the only person in the vehicle; and responsive to determining that one or more events have occurred that are likely to increase the stress level of the operator of the vehicle and that the operator is the only person in the vehicle, output, for playback by the one or more audio output components, media data likely to reduce the stress level of the operator.

In another example, a computer-readable storage medium storing instructions that, when executed, cause one or more processors of an in-vehicle computing system to: determine whether one or more events have occurred that are likely to increase a stress level of an operator of the vehicle; determine whether the operator is the only person in the vehicle; and responsive to determining that one or more events have occurred that are likely to increase the stress level of the operator of the vehicle and that the operator is the only person in the vehicle, output, for playback by the one or more audio output components, media data likely to reduce the stress level of the operator.

In another example, a vehicle computing system includes means for determining whether one or more events have occurred that are likely to increase a stress level of an operator of a vehicle; means for determining whether the operator is the only person in the vehicle; and means for, outputting, for playback by one or more output devices included in the vehicle, media data likely to reduce the stress level of the operator in response to determining that one or more events have occurred that are likely to increase the stress level of the operator of the vehicle and that the operator is the only person in the vehicle.

The details of one or more examples of the disclosure are set forth in the accompanying drawings and the description below. Other features, objects, and advantages will be apparent from the description and drawings, and from the claims.

DETAILED DESCRIPTION

Figure 1:
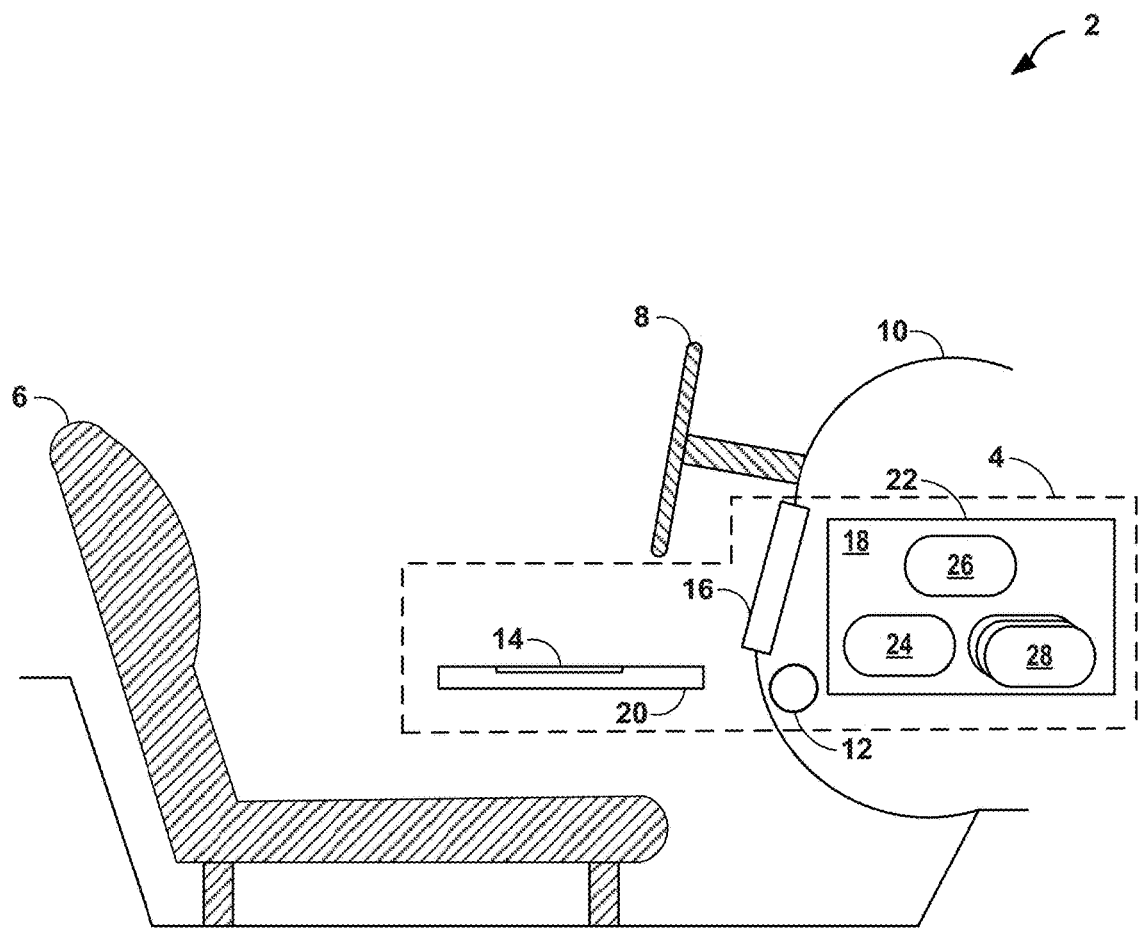
FIG. 1 is a conceptual diagram illustrating an interior of a vehicle that includes a vehicle computing system configured to reduce a stress level of an operator of the vehicle, in accordance with one or more techniques of this disclosure.

In general, this disclosure is directed to techniques for enabling in-vehicle computing systems to reduce stress levels of vehicle operators. For instance, where events have occurred that are likely to increase a stress level of an operator of a vehicle, an in-vehicle computing system of the vehicle may output media data likely to reduce the stress level of the operator. As one illustrative example, after the operator stops short, the in-vehicle computing system may engage in an audio dialog with the operator in an attempt to reduce the operator's stress level.

However, in some situations, such as where the operator is not the only person in the vehicle, it may be undesirable for the in-vehicle computing system to output the media data. For example, where there is another person in the vehicle, the other person is already available to reduce the stress level of the operator by conversing with the operator and the output of the media data may interrupt or prevent such a conversation between the operator and the other person.

In accordance with one or more techniques of this disclosure, an in-vehicle computing system of a vehicle may output media data likely to reduce a stress level of an operator of the vehicle in response to determining that one or more events have occurred that are likely to increase the stress level of the operator and that the operator is the only person in the vehicle. As one example, where the operator is alone in the vehicle and has been looking for a parking spot for longer than a threshold amount of time, the in-vehicle computing system may engage in an audio dialog with the operator in an attempt to reduce the stress level of the operator. As another example, where the operator is alone in the vehicle and stuck in traffic, the in-vehicle computing system may output music likely to reduce the stress level of the operator. In this way, a stress level of an operator may be reduced when there are no other people in the vehicle.

Throughout the disclosure, examples are described where an in-vehicle computing system, computing device and/or a computing system analyzes information (e.g., context, locations, speeds, search queries, etc.) associated with a computing device and a user of a computing device, only if the computing device receives permission from the user of the computing device to analyze the information. For example, in situations discussed below, before a computing device or computing system can collect or may make use of information associated with a user, the user may be provided with an opportunity to provide input to control whether programs or features of the computing device and/or computing system can collect and make use of user information (e.g., information about a user's current location, current speed, etc.), or to dictate whether and/or how to the device and/or system may receive content that may be relevant to the user. In addition, certain data may be treated in one or more ways before it is stored or used by the computing device and/or computing system, so that personally-identifiable information is removed. For example, a user's identity may be treated so that no personally identifiable information can be determined about the user, or a user's geographic location may be generalized where location information is obtained (such as to a city, ZIP code, or state level), so that a particular location of a user cannot be determined. Thus, the user may have control over how information is collected about the user and used by the computing device and computing system.

FIG. 1 is a conceptual diagram illustrating an interior of a vehicle that includes a vehicle computing system configured to reduce a stress level of an operator of the vehicle, in accordance with one or more techniques of this disclosure. As illustrated in FIG. 1, vehicle 2 includes vehicle computing system 4, seat 6, steering wheel 8, and dashboard 10.

As illustrated in FIG. 1, vehicle 2 may be an automobile, but aspects of the present disclosure may also be applicable to other types of vehicles, including trucks, motorcycles, aircraft, watercraft, trains, or other vehicles. A driver may normally occupy seat 6, which may be positioned directly behind steering wheel 8 of vehicle 2 such that an occupant of seat 6 may physically control steering wheel 8. Steering wheel 8 may protrude from dashboard 10. At least one front passenger seat may be laterally positioned adjacent to seat 6. Other passenger seats may be positioned behind seat 6 or in front of seat 6.

A collection of devices, components, and modules that may each be included in vehicle computing system 4 is also shown in FIG. 1. Vehicle computing system 4 includes, but is not limited to, presence-sensitive panel 14, display 16 and control unit 18. One or more components of vehicle computing system 4, such as presence-sensitive panel 14 may be directly and physically accessible to occupants seated in the front driver and front passenger seats of vehicle 2, and may be located within, near, or on center console 20. Such components may be within easy reach of such occupants, and may also or alternatively be positioned in another passenger area of vehicle 2, such as a back seat. As further described below, presence-sensitive panel 14 may function as an input device for vehicle computing system 4. In some examples, presence-sensitive panel 14 may be integrated into display 16 such that display 16 may be a presence-sensitive display. In some examples, one or more components of vehicle computing system 4 that may not necessarily require physical access by occupants of vehicle 2 (such as, in some examples, speakers 12, display 16, and control unit 18), may be positioned in or on or integrated into dashboard 10.

As described and illustrated, some or all of vehicle computing system 4 may be housed within dashboard 10, which may in some examples be constructed of plastic, vinyl, leather, rubber, aluminum, steel, or any other suitable material. Control unit 18 may be housed within housing 22, which may also be constructed of plastic, vinyl, rubber, aluminum, steel, or any other suitable material. In some examples, housing 22 may also be a rigid case that encloses and otherwise protects one or more electrical components that provide functionality for vehicle computing system 4. In some examples, housing 22 may be affixed, mounted or otherwise integrated with the automobile dashboard or console.

Figure 2:
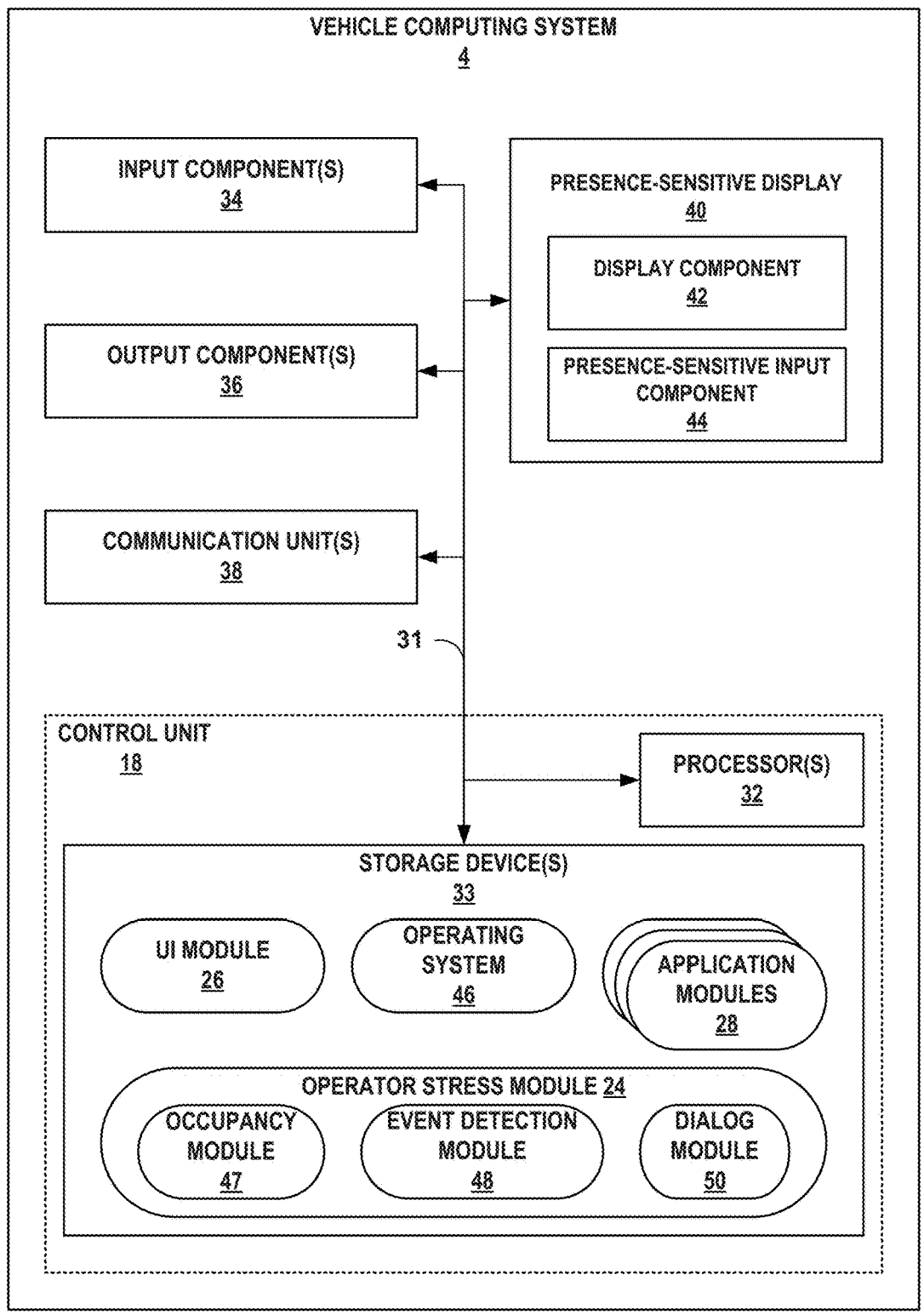
FIG. 2 is a block diagram illustrating an example vehicle computing system configured to reduce a stress level of a vehicle operator, in accordance with one or more techniques of this disclosure.

Control unit 18 may provide an operating environment or platform for one or one more modules, such as a combination of hardware, firmware, and software, as further illustrated in FIG. 2. For instance, control unit 18 may include one or more processors and storage devices that may execute instructions and store data of one or more modules. Control unit 18 may also be operably coupled to one or more other software and/or hardware components, including presence-sensitive panel 14, and display 16 to control, configure, and/or communicate information with the components, to name only a few example operations.

Vehicle computing system 4 may operate to assist, inform, entertain, or perform other tasks that require user interactions with occupants of a vehicle. Vehicle computing system 4 may be referred to as an in-vehicle infotainment (IVI) system, or a subcomponent thereof. For example, vehicle computing system 4 may include one or more application modules 4 that perform functions or process information on behalf of one or more occupants of vehicle 2. For instance, vehicle computing system 4 may provide a navigation service that provides directions to destinations. Vehicle computing system 4 may also provide an information retrieval service that provides information in response to queries and/or as preemptive assistance or recommendations. Vehicle computing system 4 may also provide vehicle data about vehicle 2, or multimedia such as audio or video. Mentioned are only a few examples of the functionality that may be provided by vehicle computing system 4, and vehicle computing system 4 may provide many additional capabilities. In this and other ways, vehicle computing system 4 may improve the driving or riding experience for one or more occupants of vehicle 2.

In some examples, vehicle computing system 4 may be controlled through input detected by presence-sensitive panel 14. Vehicle computing system 4 may also be controlled through input detected by one or more additional input devices (e.g., microphones, physical buttons or switches, or other types of input devices).

Presence-sensitive panel 14 may, in some examples, function simply as an input device for touch input, provided by user input that occurs directly and physically at presence-sensitive panel 14. For instance, presence-sensitive panel 14 may function as a presence-sensitive input device using a presence-sensitive device, such as a resistive touchscreen or touch panel, a surface acoustic wave touchscreen or touch panel, a capacitive touchscreen or touch panel, a projective capacitance touchscreen or touch panel, a pressure-sensitive screen or touch panel, an acoustic pulse recognition touchscreen or touch panel, or another presence-sensitive screen or touch panel technology.

Display 16 may function as an output device, such as a display device, using any one or more of a liquid crystal display (LCD), dot matrix display, light emitting diode (LED) display, organic light-emitting diode (OLED) display, e-ink, or similar monochrome or color display capable of outputting visible information to a user or vehicle occupant. In some examples, display 16 may also function as an input device, so that it serves as both an input and output device. In such examples, display 16 may include an integrated presence-sensitive input device (e.g., presence-sensitive panel 14 may be integrated into display 16) and a display device. For instance, display 16 may function as a presence-sensitive input device using a presence-sensitive screen, such as a resistive touchscreen, a surface acoustic wave touchscreen, a capacitive touchscreen, a projective capacitance touchscreen, a pressure-sensitive screen, an acoustic pulse recognition touchscreen, or another presence-sensitive screen technology. Based on user input, display 16 may present output to a user. For instance, display 16 may present various user interfaces of applications (e.g., a navigation application) executing at vehicle computing system 4. An occupant of the vehicle, such as a driver, may provide user input to interact with one or more of such applications.

As described above, vehicle computing system 4 may include operator stress module 24, user interface (UI) module 26 and application modules 28. Operator stress module 24, UI module 26 and application modules 28 may perform operations described herein using software, hardware, firmware, or a mixture of both hardware, software, and firmware residing in and executing by vehicle computing system 4 or at one or more other remote computing devices. As such, operator stress module 24, UI module 26, and application modules 28 may be implemented as hardware, software, and/or a combination of hardware and software. Vehicle computing system 4 may execute operator stress module 24, UI module 26, application modules 28, or one or more other modules as or within a virtual machine executing on underlying hardware. Operator stress module 24, UI module 26, and application modules 28 may be implemented in various ways. For example, operator stress module 24, UI module 26, and application modules 28 may be implemented as a downloadable or pre-installed application or "app." In another example, operator stress module 24, UI module 26, and application modules 28 may be implemented as part of an operating system of vehicle computing system 4.

Application modules 28 may include functionality to perform any variety of operations on vehicle computing system 4. For instance, application modules 28 may include a navigation application, weather application, a phone dialer application, an information retrieval application, a multimedia application, a vehicle information application, an email application, a text messing application, instant messaging application, social networking application, weather application, stock market application, emergency alert application, sports application, to name only a few examples. Although shown as operable within control unit 18 of vehicle computing system 4, one or more of application modules 28 may be operable by a remote computing device that is communicatively coupled to vehicle computing system 4. In such examples, an application module executing at a remote computing device may cause the remote computing device to send the content and intent information using any suitable form of data communication (e.g., wired or wireless network, short-range wireless communication such as Near Field Communication or Bluetooth, etc.). In some examples, a remote computing device may be a computing device that is separate from a computing device included in vehicle computing system 4. For instance, the remote computing device may be operatively coupled to vehicle computing system 4 by a network. Examples of a remote computing device may include, but is not limited to a server, smartphone, tablet computing device, smart watch, and desktop computer. In some examples, a remote computing device may or may not be an integrated component of vehicle computing system 4.

UI module 26 of vehicle computing system 4 may receive, from presence-sensitive panel 102, one or more indications of user input detected at presence-sensitive panel 14. Generally, each time presence-sensitive panel 14 detects user input at a particular location of presence-sensitive panel 14, UI module 26 may receive an indication of user input or information about the user input from presence-sensitive panel 14. UI module 26 may assemble the information received from presence-sensitive panel 14 into a set of one or more events, such as a sequence of one or more touch events. Each touch event in the sequence may include data or components that represent parameters (e.g., when, where, originating direction) characterizing a presence and/or movement of input at presence-sensitive panel 14. Each touch event in the sequence may include a location component corresponding to a location of presence-sensitive panel 14, a time component related to when presence-sensitive panel 14 detected user input at the location, and/or an action component related to whether the touch event corresponds to a lift up or a push down at the location.

UI module 26 may determine one or more characteristics of the user input based on the sequence of touch events and include information about these one or more characteristics within each touch event in the sequence of touch events. For example, UI module 26 may determine a start location of the user input, an end location of the user input, a density of a portion of the user input, a speed of a portion of the user input, a direction of a portion of the user input, and a curvature of a portion of the user input. UI module 26 may transmit indications of user input from presence-sensitive panel 14 to other modules, such as application modules 28. UI module 26 may determine one or more single- or multi-touch gestures provided by a user. UI module 26 may also act as an intermediary between various components of vehicle computing system 4 to make determinations based on input detected by presence-sensitive panel 14 and generate output presented by display 16. For instance, UI module 26 may receive data from one or more application modules 28 and cause display 16 to output content, such as a graphical user interface, for display.

Vehicle 2 may include a wide variety of sensors, which may be configured to provide output to vehicle computing system 4. For instance, vehicle 2 may include a speed sensor, an acceleration sensor, a position sensor, and the like. In some examples, vehicle computing system 4 may be configured to communicate with the sensors via a network or bus of vehicle 2, such as a component area network (CAN) bus.

Vehicle computing system 4 may be configured to detect, based on data received from the sensors, occurrences of events that are likely to increase a stress level of an operator of vehicle 2. Some events that vehicle computing system 4 may monitor for that are likely to increase a stress level of the operator include, but are not limited to, stopping-short, looking for a parking spot for an extended period of time, and being in traffic.

As discussed above, it may be desirable to reduce stress levels of vehicle operators. In particular, it may be desirable to reduce the stress level of a vehicle operator where one or more events have occurred that are likely to increase the stress level of the vehicle operator. In accordance with one or more techniques of this disclosure, vehicle computer system 4 may include operator stress module 24, which may include functionality to reduce a stress level of an operator of vehicle 2. For instance, responsive to determining that one or more events have occurred that are likely to increase the stress level of the operator of vehicle 2, operator stress module 24 may output, for playback by one or more speakers included in vehicle 2, media data likely to reduce the stress level of the operator. As one illustrative example, responsive to determining that the operator had to stop short, operator stress module 24 may cause vehicle computing system 4 to engage in an audio dialog with the operator in an attempt to reduce the stress level of the operator, such as by changing the subject or diverting the operator's attention to calmer topics.

However, in some situations, such as where the operator is not the only person in the vehicle, it may be undesirable for vehicle computing system 4 to output the media data. For example, where there is another person in vehicle 2, the other person is already available to reduce the stress level of the operator by conversing with the operator and the output of the media data may interrupt or prevent such a conversation between the operator and the other person.

In accordance with one or more techniques of this disclosure, operator stress module 24 may output, for playback by one or more output devices included in vehicle 2, media data likely reduce a stress level of the operator in response to determining that one or more events have occurred that are likely to increase the stress level of the operator and that the operator is the only person in vehicle 2. As one example, where the operator is alone in vehicle 2 and has been looking for a parking spot for longer than a threshold amount of time, operator stress module 24 may cause vehicle computing system 4 to engage in an audio dialog with the operator in an attempt to reduce the stress level of the operator. As another example, where the operator is alone in vehicle 2 and stuck in traffic, operator stress module 24 may output music likely to reduce the stress level of the operator. In this way, operator stress module 24 may reduce the stress level of the operator when there are no other people in vehicle 2.

It should be understood that, while the media data output by operator stress module 24 is likely to reduce the stress level of the operator, such a reduction in stress level cannot be guaranteed. Instead, the media data output by operator stress module 24 may be media data that is determined to have a likelihood of reducing the operator's stress level. For instance, operator stress module 24 may determine that certain media data has a high probability of reducing the operator's stress level. This probability may be determined based on generalities and/or may be specific to the particular operator. As one example, operator stress module 24 may determine that, in general, the stress level of operators may be reduced by outputting classical music. As such, when operator stress module 24 outputs classical music, said music can be considered to be likely to reduce the stress level of the operator (i.e., enables the operator to calm down and/or relax). As another example, operator stress module 24 may determine that engaging in a dialog with the particular operator typically results in a reduction in the particular operator's stress level (i.e., enables the particular operator to calm down and/or relax). As such, when operator stress module 24 engages in a dialog with the particular operator, said dialog can be considered to be likely to reduce the stress level of the particular operator.

FIG. 2 is a block diagram illustrating an example vehicle computing system configured to reduce a stress level of a vehicle operator, in accordance with one or more techniques of this disclosure. Vehicle computing system 4 of FIG. 2 is described below within the context of FIG. 1. FIG. 2 illustrates only one particular example of vehicle computing system 4, and many other examples of vehicle computing system 4 may be used in other instances and may include a subset of the components shown in FIG. 2 or may include additional components not shown in FIG. 2.

As shown in the example of FIG. 2, vehicle computing system 4 includes one or more input components 34, one or more output components 36, one or more communication units 38, and presence-sensitive display 40, and control unit 18 that include one or more processors 32, and one or more storage devices 33. Storage devices 33 of control unit 18 may also include operator stress module 24, UI module 26, application modules 28, and operating system 46. Communication channels 31 may interconnect one or more of the components 24, 26, 28, 32, 33, 34, 36, 38, 40, and 46 for inter-component communications (physically, communicatively, and/or operatively). In some examples, communication channels 31 may include a system bus, a network connection, one or more inter-process communication data structures, or any other components for communicating data between hardware and/or software.

As shown in FIG. 2, control unit 18 may store and execute the data and instructions of one or more applications, modules or other software. Although FIG. 2 illustrates control unit 18 as including one or more processors 218 and one or more storages device 220, control unit 18 may include more or fewer components than shown in FIG. 2. For instance, control unit 18 may include one or more output devices, input devices, input/output ports or interface, sensors and/or communication units to name only a few examples. In other examples, control unit 18 may only include one or more processors. In any case, control unit 18 may provide an operating environment for one or one more modules, such as operator stress module 24, user-interface (UI) module 26, application modules 28, and operating system 46.

One or more processors 32 may implement functionality and/or execute instructions within vehicle computing system 4. For example, processors 32 of control unit 18 may receive and execute instructions stored by storage devices 33 that provide the functionality of operator stress module 24, UI module 26, application modules 28, and operating system 46. These instructions executed by processors 32 may cause vehicle computing system 4 to store and/or modify information, within storage devices 33 during program execution. Processors 32 may execute instructions of operator stress module 24, UI module 26, application modules 28, and operating system 46 to perform one or more operations. That is, operator stress module 24, UI module 26, application modules 28, and operating system 46 may be operable by processors 32 to perform various functions described herein.

One or more input components 34 of vehicle computing system 4 may receive input. Examples of input are tactile, audio, and video input. In some examples, input components 34 may include functionality of presence-sensitive panel 14 of FIG. 1. Input components 34 of vehicle computing system 4, in one example, includes a presence-sensitive input device (e.g., a touch sensitive screen, a presence-sensitive display), mouse, keyboard, buttons, switches, voice responsive system, video camera, microphone or any other type of device for detecting input from a human or machine. In some examples, input components 34 may include one or more sensor components one or more location sensors (GPS components, Wi-Fi components, cellular components), one or more temperature sensors, one or more movement sensors (e.g., accelerometers, gyros), one or more pressure sensors (e.g., barometer), one or more ambient light sensors, and one or more other sensors (e.g., microphone, camera, infrared proximity sensor, hygrometer, and the like). Other sensors may include a heart rate sensor, magnetometer, glucose sensor, hygrometer sensor, olfactory sensor, compass sensor, step counter sensor, to name a few other non-limiting examples.

One or more output devices 36 of vehicle computing system 4 may generate output. Examples of output are tactile, audio, and video output. In some examples, output components 36 may include functionality of display 16 of FIG. 1. Output devices 36 of vehicle computing system 4, in one example, include a presence-sensitive screen, sound card, video graphics adapter card, speaker, cathode ray tube (CRT) monitor, liquid crystal display (LCD), or any other type of device for generating output to a human or machine. Output devices 36 may include display devices such as cathode ray tube (CRT) monitor, liquid crystal display (LCD), Light-Emitting Diode (LED) or any other type of device for generating tactile, audio, and/or visual output.

One or more communication units 38 of vehicle computing system 4 may communicate with external devices by transmitting and/or receiving data. For example, vehicle computing system 4 may use communication units 38 to transmit and/or receive radio signals on a radio network such as a cellular radio network. In some examples, communication units 38 may transmit and/or receive satellite signals on a satellite network such as a Global Positioning System (GPS) network or a Global Navigation Satellite System (GLONASS) network. Examples of communication units 38 include a network interface card (e.g. such as an Ethernet card), an optical transceiver, a radio frequency transceiver, a GPS receiver, or any other type of device that can send and/or receive information. Other examples of communication units 38 may include Bluetooth®, GPS, 3G, 4G, and Wi-Fi®, radios found in mobile devices as well as Universal Serial Bus (USB) controllers and the like.

In some examples, presence-sensitive display 40 of vehicle computing system 4 may include functionality of input components 34 and/or output components 36. In the example of FIG. 2, presence-sensitive display 40 may include a presence-sensitive input component 44, such as a presence-sensitive screen or touch-sensitive screen. In some examples, presence-sensitive input component 44 may detect an object at and/or near the presence-sensitive input device. As one example range, presence-sensitive input component 44 may detect an object, such as a finger or stylus that is within two inches or less of presence-sensitive input component 44. Presence-sensitive input component 44 may determine a location (e.g., an (x,y) coordinate) of the presence-sensitive input device at which the object was detected. In another example range, presence-sensitive input component 44 may detect an object six inches or less from presence-sensitive input component 44 and other ranges are also possible. Presence-sensitive input component 44 may determine the location of presence-sensitive input component 44 selected by a user's finger using capacitive, inductive, and/or optical recognition techniques.

In some examples, presence-sensitive display 40 may also provide output to a user using tactile, audio, or video stimuli as described with respect to output components 36. For instance, presence-sensitive display 40 may include display component 42 that presents a graphical user interface. Display component 42 may be any type of output device that provides visual output, such as described with respect to output components 36. Presence-sensitive display 40 may, in some examples, be an external component that shares a data path with other components of vehicle computing system 4 for transmitting and/or receiving input and output. For instance, presence-sensitive display 40 may be a built-in component of a head-unit that includes control unit 18, such as housing 22 of FIG. 1, located within and physically connected to the external packaging of control unit 18. In another example, presence-sensitive display 40 may be an external component of control unit 18 located outside and physically separated from the packaging of control unit 18 (e.g., a monitor, a projector, etc. that shares a wired and/or wireless data path with a tablet computer).

One or more storage devices 33 within vehicle computing system 4 may store information for processing during operation of vehicle computing system 4. In some examples, one or more of storage devices 33 are temporary memories, meaning that a primary purpose of the one or more storage devices is not long-term storage. Storage devices 33 on vehicle computing system 4 may be configured for short-term storage of information as volatile memory and therefore not retain stored contents if deactivated. Examples of volatile memories include random access memories (RAM), dynamic random access memories (DRAM), static random access memories (SRAM), and other forms of volatile memories known in the art.

Storage devices 33, in some examples, also include one or more computer-readable storage media. Storage devices 33 may be configured to store larger amounts of information than volatile memory. Storage devices 33 may further be configured for long-term storage of information as non-volatile memory space and retain information after activate/off cycles. Examples of non-volatile memories include magnetic hard discs, optical discs, flash memories, or forms of electrically programmable memories (EPROM) or electrically erasable and programmable (EEPROM) memories. Storage devices 33 may store program instructions and/or data associated with operator stress module 24, UI module 26, application modules 28, and operating system 46.

Operating system 46, in some examples, controls the operation of components of vehicle computing system 4. For example, operating system 46, in one example, facilitates the communication of operator stress module 24, UI module 26, and application modules 28 with processors 32, storage devices 33, input components 34, output components 36, communication units 38, presence-sensitive display 40.

Operator stress module 24 may include functionality to reduce a stress level of an operator of vehicle 2. As shown in the example of FIG. 2, operator stress module 24 may include occupancy module 47, event detection module 48, and dialog module 50.

Occupancy module 47 may include functionality to determine whether an operator of vehicle 2 is the only person in vehicle 2. For instance, occupancy module 47 may determine that the operator is the only person in vehicle 2 where there are no passengers in vehicle 2. In some examples, occupancy module 47 may determine whether there are any passengers in vehicle 2 based on data received from occupancy sensors included in a plurality of seats of vehicle 2. As one example, occupancy module 47 may determine that the operator is the only person in vehicle 2 where an occupancy sensor included in the driver's seat (e.g., seat 6 of FIG. 1) indicates that the driver's seat is occupied and sensors included on the other seats of vehicle 2 indicate that the other seats are not occupied. As another examples, occupancy module 47 may visually identify, based on one or more images captured by one or more cameras of input components 34, whether there is more than one person in vehicle 2. As another examples, occupancy module 47 may determine that there is more than one person in vehicle 2 in response to determining that devices associated with more than one person are in vehicle 2. For instance, occupancy module 47 may determine that there is more than one person in vehicle 2 in response to determining that two or more devices are attempting to pair (e.g., establish a Bluetooth connection) with vehicle 2. In any case, occupancy module 47 may output an indication of whether the operator is the only person in vehicle 2 (e.g., a "sole occupant" flag) to one or more other components of vehicle computing system 4.

Event detection module 48 may include functionality to determine whether one or more events have occurred that are likely to increase a stress level of an operator of vehicle 2. Some events that event detection module 48 may monitor for that are likely to increase a stress level of the operator include, but are not limited to, stopping-short, looking for a parking spot for an extended period of time, and being in traffic. Event detection module 48 may determine whether one or more events have occurred by monitoring various parameters of vehicle 2. Some parameters that event detection module 48 may monitor include, but are not necessarily limited to, a speed of vehicle 2, an acceleration of vehicle 2, a position of vehicle 2, a speed limit of a road on-which vehicle 2 is traveling, and an activity engaged in by the operator of vehicle 2. Event detection module 48 may output an indication that one or more events that are likely to increase the stress level of the operator have occurred to one or more other components of vehicle computing system 4.

As discussed above, the stress level of the operator of vehicle 2 may be increased when vehicle 2 is in traffic. In some examples, to determine whether vehicle 2 is in traffic, event detection module 48 may determine whether a speed of vehicle 2 is less than a threshold speed that is based on a speed limit of a road on which vehicle 2 is traveling. The threshold speed used by event detection module 48 may be a percentage (e.g., 10%, 25%, 50%, 75%, etc.) of the speed limit of a road on which vehicle 2 is traveling. For instance, if the road on-which vehicle 2 is traveling has a speed limit of 65 miles per hour, event detection module 48 may determine that the threshold speed is 32.5 miles per hour (i.e., 50% of the speed limit of 65 miles per hour). As such, if the speed of vehicle 2 is less than 32.5 miles per hour, event detection module 48 may determine that vehicle 2 is in traffic. In any case, responsive to determining that vehicle 2 is in traffic, event detection module 48 may output an indication to one or more other components of vehicle computing system 4 that an event that is likely to increase the stress level of the operator has occurred.

As discussed above, the stress level of the operator of vehicle 2 may be increased when vehicle 2 stops-short. In some examples, to determine whether vehicle 2 has stopped-short, event detection module 48 may determine whether vehicle 2 decelerated at a rate exceeding a deceleration threshold (e.g., 3 miles per hour per second, 5 miles per hour per second, 7 miles per hour per second, 10 miles per hour per second, etc.). For instance, if the deceleration threshold is 7 miles per hour per second and acceleration/speed data indicates that vehicle 2 decelerated at 10 miles per hour per second, event detection module 48 may determine that vehicle 2 has stopped-short. It should be understood that vehicle 2 may stop-short as a result of actions by the operator (i.e., pushing the brake pedal) or actions by one or more automated systems of vehicle 2 (i.e., one-or more collision avoidance systems and/or one or more automated driving systems). In any case, responsive to determining that vehicle 2 has stopped-short, event detection module 48 may output an indication to one or more other components of vehicle computing system 4 that an event that is likely to increase the stress level of the operator has occurred.

As discussed above, the stress level of the operator of vehicle 2 may be increased when the operator is unsuccessfully looking for a parking spot. In some examples, event detection module 48 may determine that the operator is unsuccessfully looking for a parking spot in response to determining that an amount of time for which the operator has been looking for a parking spot is greater than a threshold amount of time (e.g., 5 minutes, 10 minutes, 20 minutes, 30 minutes, etc.). Event detection module 48 may determine whether the operator is looking for a parking spot based on a variety of factors, which may be used separately or in combination with each other. As one example, event detection module 48 may determine that the operator is looking for a parking spot in response to determining that vehicle 2 is within a threshold distance (e.g., 50 feet, 100 feet, 250 feet, quarter-mile, half-mile, etc.) from a destination. In some examples, event detection module 48 may determine the destination based on one or more navigation queries entered into vehicle computing system 4, a predetermined "home" address of the operator, or a predetermined "work" address of the operator. As another example, event detection module 48 may determine that the operator is looking for a parking spot is response to determining that vehicle 2 is circling (i.e., that vehicle 2 has driven past a particular location multiple times within a threshold period of time) and/or traveling slowly (i.e., less than a threshold of a speed limit of a road on-which vehicle 2 is traveling). As another example, event detection module 48 may determine that the operation is looking for a parking spot in response to vehicle computing system 4 receiving a query from the operator, the query requesting a location of a parking spot.

In some examples, event detection module 48 may base the determination of whether the operator is unsuccessfully looking for a parking spot on the time of day. For instance, event detection module 48 may use a shorter threshold during the night than during the day. In any case, responsive to determining that the operator is unsuccessfully looking for a parking spot, event detection module 48 may output an indication to one or more other components of vehicle computing system 4 that an event that is likely to increase the stress level of the operator has occurred.

Dialog module 50 may include functionality to engage in a dialog (i.e., a conversation) with an operator of vehicle 2. For instance, dialog module 50 may engage in a dialog with the operator of vehicle 2 in an attempt to reduce the stress level of the operator in response to receiving an indication that one or more events that are likely to increase the stress level of the operator have occurred. In some examples, dialog module 50 may engage in a dialog with the operator by outputting, for playback by one or more of output components 36, one or more pre-determined (i.e., "canned") phrases. Some example pre-determined phrases that may be output by dialog module 50 include, but are not limited to, "slow down," "can you believe that guy," "some people cannot drive, am I right?," "this traffic is not too bad, we should be at the office at the usual time," etc. In some examples, dialog module 50 may engage in a dialog with the operator through the use of a natural language processing system. For instance, dialog module 50 may receive, via a microphone of input components 34, an indication of a statement made by the operator. Using the natural language processing system, dialog module 50 may compose a response and output the response via one or more speakers of output components 36. In either of these ways, dialog module 50 may be considered to function as a so-called "chatterbot."

In some examples, operator stress module 24 may be configured to incorporate one or more third party frameworks to reduce the stress level of the operator. As one example, dialog module 50 may incorporate one or more third party frameworks to determine phrases to output in order to reduce the stress level of the operator.

Figure 3:
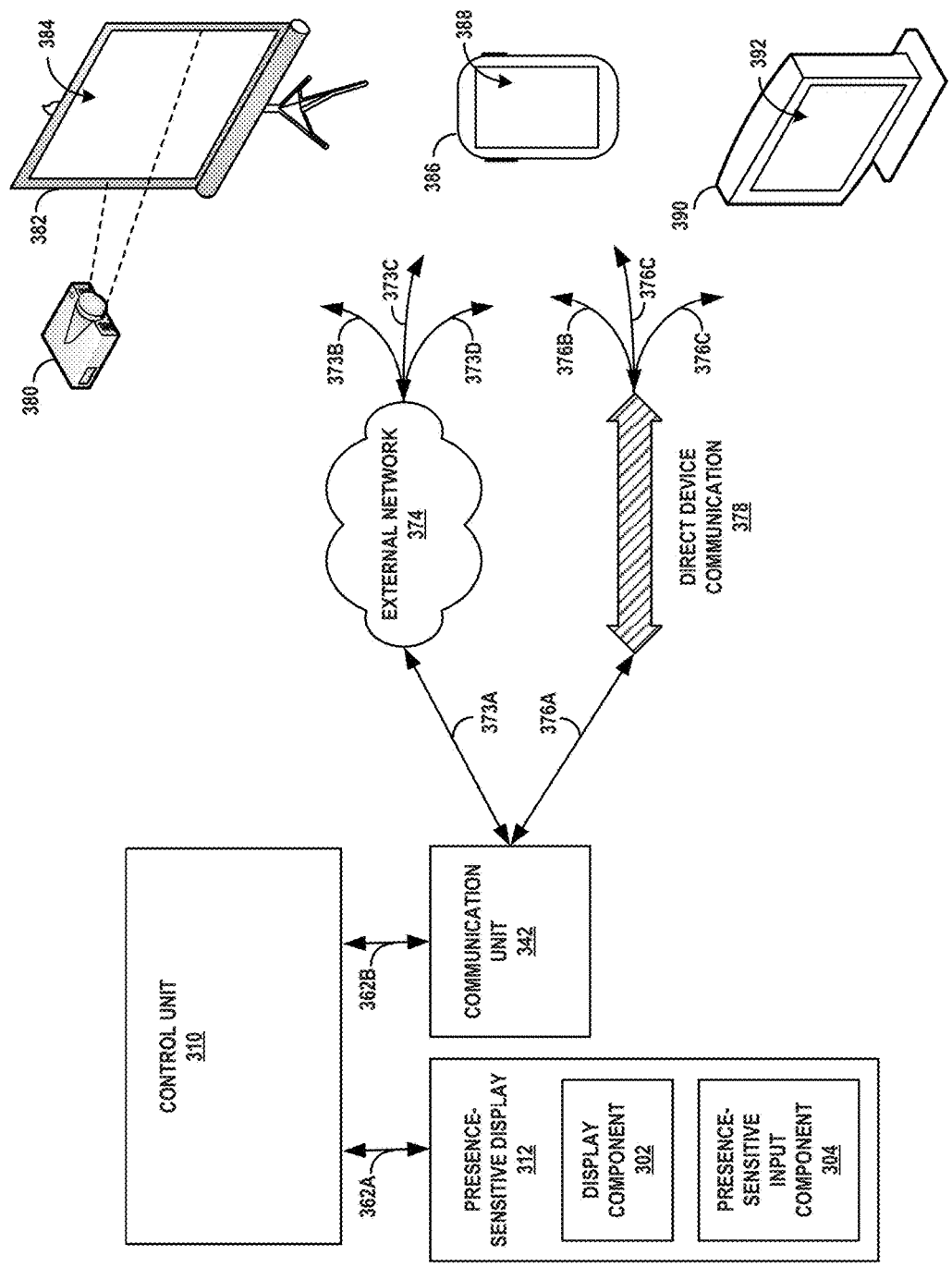
FIG. 3 is a block diagram illustrating an example computing device that outputs graphical content for display at a remote device, in accordance with one or more techniques of the present disclosure.

FIG. 3 is a block diagram illustrating an example computing device that outputs graphical content for display at a remote device, in accordance with one or more techniques of the present disclosure. Graphical content, generally, may include any visual information that may be output for display, such as text, images, or a group of moving images, to name only a few examples. The example shown in FIG. 3 includes a computing device 310, a PSD 312, communication unit 342, projector 380, projector screen 382, mobile device 386, and visual display component 390. In some examples, PSD 312 may be a presence-sensitive display as described in FIGS. 1-2. Although shown for purposes of example in FIGS. 1 and 2 as a stand-alone control unit 18, a computing device such as control unit 310 may, generally, be any component or system that includes a processor or other suitable computing environment for executing software instructions and, for example, need not include a presence-sensitive display.

As shown in the example of FIG. 3, control unit 310 may be a processor that includes functionality as described with respect to processors 240 in FIG. 2. In such examples, control unit 310 may be operatively coupled to PSD 312 by a communication channel 362A, which may be a system bus or other suitable connection. Control unit 310 may also be operatively coupled to communication unit 342, further described below, by a communication channel 362B, which may also be a system bus or other suitable connection. Although shown separately as an example in FIG. 3, control unit 310 may be operatively coupled to PSD 312 and communication unit 342 by any number of one or more communication channels.

In other examples, such as illustrated previously by computing device 110 in FIGS. 1A-1E or computing device 210 in FIG. 2, a computing device may refer to a portable or mobile device such as mobile phones (including smart phones), laptop computers, etc. In some examples, a computing device may be a desktop computer, tablet computer, smart television platform, camera, personal digital assistant (PDA), server, or mainframes.

PSD 312 may include display component 302 and presence-sensitive input component 304. Display component 302 may, for example, receive data from control unit 310 and display the graphical content. In some examples, presence-sensitive input component 304 may determine one or more user inputs (e.g., continuous gestures, multi-touch gestures, single-touch gestures) at PSD 312 using capacitive, inductive, and/or optical recognition techniques and send indications of such user input to control unit 310 using communication channel 362A. In some examples, presence-sensitive input component 304 may be physically positioned on top of display component 302 such that, when a user positions an input unit over a graphical element displayed by display component 302, the location at which presence-sensitive input component 304 corresponds to the location of display component 302 at which the graphical element is displayed.

As shown in FIG. 3, control unit 310 may also include and/or be operatively coupled with communication unit 342. Communication unit 342 may include functionality of communication unit 242 as described in FIG. 2. Examples of communication unit 342 may include a network interface card, an Ethernet card, an optical transceiver, a radio frequency transceiver, or any other type of device that can send and receive information. Other examples of such communication units may include Bluetooth, 3G, and Wi-Fi radios, Universal Serial Bus (USB) interfaces, etc. Control unit 310 may also include and/or be operatively coupled with one or more other devices (e.g., input devices, output components, memory, storage devices) that are not shown in FIG. 3 for purposes of brevity and illustration.

FIG. 3 also illustrates a projector 380 and projector screen 382. Other such examples of projection devices may include electronic whiteboards, holographic display components, and any other suitable devices for displaying graphical content. Projector 380 and projector screen 382 may include one or more communication units that enable the respective devices to communicate with control unit 310. In some examples, the one or more communication units may enable communication between projector 380 and projector screen 382. Projector 380 may receive data from control unit 310 that includes graphical content. Projector 380, in response to receiving the data, may project the graphical content onto projector screen 382. In some examples, projector 380 may determine one or more user inputs (e.g., continuous gestures, multi-touch gestures, single-touch gestures) at projector screen using optical recognition or other suitable techniques and send indications of such user input using one or more communication units to control unit 310. In such examples, projector screen 382 may be unnecessary, and projector 380 may project graphical content on any suitable medium and detect one or more user inputs using optical recognition or other such suitable techniques.

Projector screen 382, in some examples, may include a presence-sensitive display 484. Presence-sensitive display 384 may include a subset of functionality or all of the functionality of presence-sensitive display 112 and/or 312 as described in this disclosure. In some examples, presence-sensitive display 384 may include additional functionality. Projector screen 382 (e.g., an electronic whiteboard), may receive data from control unit 310 and display the graphical content. In some examples, presence-sensitive display 384 may determine one or more user inputs (e.g., continuous gestures, multi-touch gestures, single-touch gestures) at projector screen 382 using capacitive, inductive, and/or optical recognition techniques and send indications of such user input using one or more communication units to control unit 310.

FIG. 3 also illustrates mobile device 386 and visual display component 390. Mobile device 386 and visual display component 390 may each include computing and connectivity capabilities. Examples of mobile device 386 may include e-reader devices, convertible notebook devices, hybrid slate devices, etc. Examples of visual display component 390 may include other devices such as televisions, computer monitors, etc. In some examples, visual display component 390 may be a vehicle cockpit display or navigation display (e.g., in an automobile, aircraft, or some other vehicle). In some examples, visual display component 390 may be a home automation display or some other type of display that is separate from control unit 310.

As shown in FIG. 3, mobile device 386 may include a presence-sensitive display 388. Visual display component 390 may include a presence-sensitive display 392. Presence-sensitive displays 388, 392 may include a subset of functionality or all of the functionality of presence-sensitive display 112, 212, and/or 312 as described in this disclosure. In some examples, presence-sensitive displays 388, 392 may include additional functionality. In any case, presence-sensitive display 392, for example, may receive data from control unit 310 and display the graphical content. In some examples, presence-sensitive display 392 may determine one or more user inputs (e.g., continuous gestures, multi-touch gestures, single-touch gestures) at projector screen using capacitive, inductive, and/or optical recognition techniques and send indications of such user input using one or more communication units to control unit 310.

As described above, in some examples, control unit 310 may output graphical content for display at PSD 312 that is coupled to control unit 310 by a system bus or other suitable communication channel. Control unit 310 may also output graphical content for display at one or more remote devices, such as projector 380, projector screen 382, mobile device 386, and visual display component 390. For instance, control unit 310 may execute one or more instructions to generate and/or modify graphical content in accordance with techniques of the present disclosure. Control unit 310 may output the data that includes the graphical content to a communication unit of control unit 310, such as communication unit 342. Communication unit 342 may send the data to one or more of the remote devices, such as projector 380, projector screen 382, mobile device 386, and/or visual display component 390. In this way, control unit 310 may output the graphical content for display at one or more of the remote devices. In some examples, one or more of the remote devices may output the graphical content at a presence-sensitive display that is included in and/or operatively coupled to the respective remote devices.

In some examples, control unit 310 may not output graphical content at PSD 312 that is operatively coupled to control unit 310. In other examples, control unit 310 may output graphical content for display at both a PSD 312 that is coupled to control unit 310 by communication channel 362A, and at one or more remote devices. In such examples, the graphical content may be displayed substantially contemporaneously at each respective device. For instance, some delay may be introduced by the communication latency to send the data that includes the graphical content to the remote device. In some examples, graphical content generated by control unit 310 and output for display at PSD 312 may be different than graphical content display output for display at one or more remote devices.

Control unit 310 may send and receive data using any suitable communication techniques. For example, control unit 310 may be operatively coupled to external network 374 using network link 373A. Each of the remote devices illustrated in FIG. 3 may be operatively coupled to network external network 374 by one of respective network links 373B, 373C, or 373D. External network 374 may include network hubs, network switches, network routers, etc., that are operatively inter-coupled thereby providing for the exchange of information between control unit 310 and the remote devices illustrated in FIG. 3. In some examples, network links 373A-373D may be Ethernet, ATM or other network connections. Such connections may be wireless and/or wired connections.

In some examples, control unit 310 may be operatively coupled to one or more of the remote devices included in FIG. 3 using direct device communication 378. Direct device communication 378 may include communications through which control unit 310 sends and receives data directly with a remote device, using wired or wireless communication. That is, in some examples of direct device communication 378, data sent by control unit 310 may not be forwarded by one or more additional devices before being received at the remote device, and vice-versa. Examples of direct device communication 378 may include Bluetooth, Near-Field Communication, Universal Serial Bus, Wi-Fi, infrared, etc. One or more of the remote devices illustrated in FIG. 3 may be operatively coupled with control unit 310 by communication links 376A-376D. In some examples, communication links 376A-376D may be connections using Bluetooth, Near-Field Communication, Universal Serial Bus, infrared, etc. Such connections may be wireless and/or wired connections.

Control unit 310 may be operatively coupled to visual display component 390 using external network 374. Control unit 310 may output a graphical user interface for display at PSD 312. For instance, control unit 310 may send data that includes a representation of the graphical user interface to communication unit 342. Communication unit 342 may send the data that includes the representation of the graphical user interface to visual display component 390 using external network 374. Visual display component 390, in response to receiving the data using external network 374, may cause PSD 392 to output the graphical user interface. In response to receiving a user input at PSD 392 to select one or more buttons of the graphical user interface, visual display component 390 may send an indication of the user input to control unit 310 using external network 374. Communication unit 342 of may receive the indication of the user input, and send the indication to control unit 310.

Figure 4:
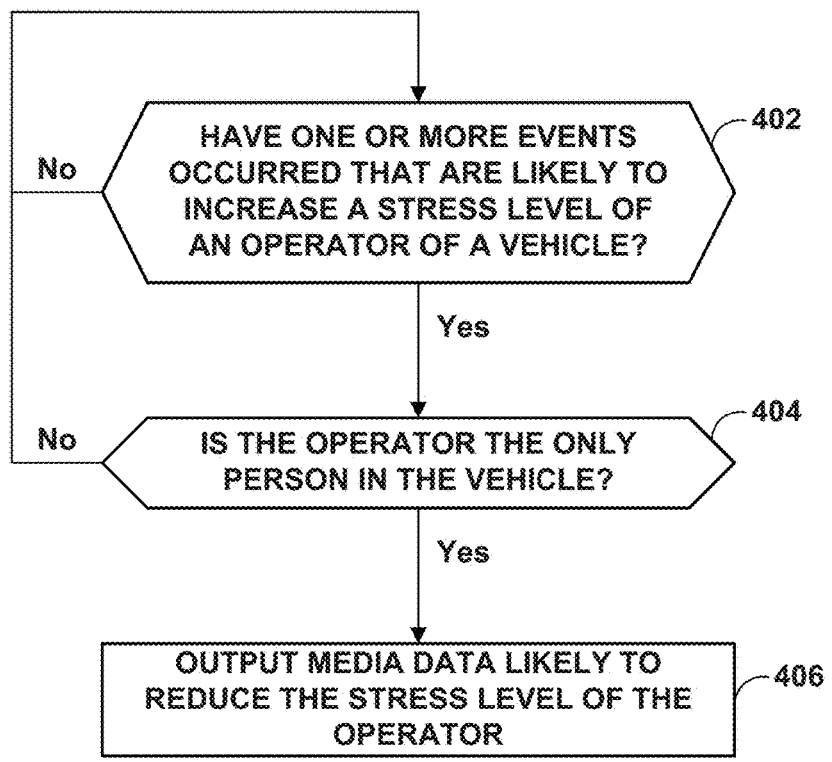
FIG. 4 is a flow diagram illustrating example operations of a vehicle computing system to reduce a stress level of a vehicle operator, in accordance with one or more techniques of the present disclosure.

FIG. 4 is a flow diagram illustrating example operations of a vehicle computing system to reduce a stress level of a vehicle operator, in accordance with one or more techniques of the present disclosure. The techniques of FIG. 4 may be performed by one or more processors of a computing system, such as vehicle computing system 4 illustrated in FIG. 1 and FIG. 2. For purposes of illustration, the techniques of FIG. 4 are described within the context of vehicle computing device 4 of FIG. 1 and FIG. 2, although computing systems having configurations different than that of vehicle computing system 4 may perform the techniques of FIG. 4.

A vehicle, such as vehicle 2 of FIG. 1, which includes vehicle computing system 4 may be used for a variety of activities, such as commuting, running errands, etc. While the vehicle is being used, vehicle computing system 4 may determine whether one or more events have occurred that are likely to increase a stress level of an operator of the vehicle (402). For instance, one or more of processors 32 of vehicle computing system 4 may execute event detection module 48 of operator stress module 24 of vehicle computing system 4 to determine whether one or more events have occurred that are likely to increase the stress level of the operator of the vehicle.

Where there is another person in the vehicle, the other person may be available to reduce the stress level of the operator by conversing with the operator. However, when the operator is alone in the vehicle, the operator may have no one to talk with and it may be desirable to reduce the stress level of the operator through other means. In accordance with one or more techniques of this disclosure, vehicle computing system 4 may determine whether the operator is the only person in the vehicle (404). For instance, one or more of processors 32 may execute occupancy module 47 of operator stress module 24 to determine whether the operator is alone in the vehicle.

Responsive to determining that one or more events have occurred that are likely to increase the stress level of the operator of the vehicle ("Yes" branch of 402) and that the operator is the only person in the vehicle ("Yes" branch of 404), vehicle computing system 4 may output, for playback by one or more output devices included in the vehicle, media data likely to reduce the stress level of the operator (406). As one example, one or more of processors 32 may execute dialog module 50 to engage in a dialog with the operator by outputting spoken phrases via one or more speakers of output components 36. As another example, one or more of processors 32 may execute a music module of application module 28 to output, via one or more speakers of output components 36, music likely to reduce the stress level of the operator. As another example, one or more of processors 32 may execute module 26 to output an indication of an offer to establish a communication session with an operator of another vehicle. If the user accepts the offer, one or more of communication units 38 may establish a communication session with an operator of another vehicle through which the operator may converse with the operator of the other vehicle. In this way, a stress level of an operator may be reduced when there are no other people in the vehicle.

The following numbered examples may illustrate one or more aspects of the disclosure:

Example 1

A method comprising: determining, by one or more processors of a computing system included in a vehicle, whether one or more events have occurred that are likely to increase a stress level of an operator of the vehicle; determining, by the one or more processors, whether the operator is the only person in the vehicle; and responsive to determining that one or more events have occurred that are likely to increase the stress level of the operator of the vehicle and that the operator is the only person in the vehicle, outputting, by the one or more processors and for playback by one or more output devices included in the vehicle, media data likely to reduce the stress level of the operator.

Example 2

The method of example 1, wherein outputting the media data likely to reduce the stress level of the operator comprises: engaging, by the computing system, in a dialog with the operator.

Example 3

The method of any combination of examples 1-2, wherein outputting the media data likely to reduce the stress level of the operator comprises: outputting, by the computing system, an indication of an offer to establish a communication session with an operator of another vehicle.

Example 4

The method of any combination of examples 1-3, wherein outputting the media data likely to reduce the stress level of the operator comprises: outputting music likely to reduce the stress level of the operator.

Example 5

The method of any combination of examples 1-4, wherein determining whether one or more events have occurred that are likely to increase a stress level of an operator of the vehicle comprises: determining that the vehicle is in traffic in response to determining that a speed of the vehicle is less than a threshold speed that is based on a speed limit of a road on which the vehicle is traveling.

Example 6

The method of any combination of examples 1-5, wherein determining whether one or more events have occurred that are likely to increase a stress level of an operator of the vehicle comprises: determining that the operator stopped-short in response to determining that the vehicle decelerated at a rate exceeding a deceleration threshold.

Example 7

The method of any combination of examples 1-6, wherein determining whether one or more events have occurred that are likely to increase a stress level of an operator of the vehicle comprises: determining that an amount of time for which the operator has been looking for a parking spot is greater than a threshold amount of time.

Example 8

The method of any combination of examples 1-7, wherein determining whether the operator is the only person in the vehicle comprises: determining, based on data received from occupancy sensors included in a plurality of seats of the vehicle, that passenger seats of the plurality of seats are not occupied.

Example 9

A vehicle computing system comprising: one or more audio output components; and one or more processors configured to perform the method of any combination of examples 1-8.

Example 10

A computer-readable storage medium storing instructions that, when executed, cause one or more processors of an in-vehicle computing system to perform the method of any combination of examples 1-8.

Example 11

A vehicle computing system comprising means for performing the method of any combination of examples 1-8.

The techniques described in this disclosure may be implemented, at least in part, in hardware, software, firmware, or any combination thereof. For example, various aspects of the described techniques may be implemented within one or more processors, including one or more microprocessors, digital signal processors (DSPs), application specific integrated circuits (ASICs), field programmable gate arrays (FPGAs), or any other equivalent integrated or discrete logic circuitry, as well as any combinations of such components. The term "processor" or "processing circuitry" may generally refer to any of the foregoing logic circuitry, alone or in combination with other logic circuitry, or any other equivalent circuitry. A control unit including hardware may also perform one or more of the techniques of this disclosure.

Such hardware, software, and firmware may be implemented within the same device or within separate devices to support the various techniques described in this disclosure. In addition, any of the described units, modules or components may be implemented together or separately as discrete but interoperable logic devices. Depiction of different features as modules or units is intended to highlight different functional aspects and does not necessarily imply that such modules or units must be realized by separate hardware, firmware, or software components. Rather, functionality associated with one or more modules or units may be performed by separate hardware, firmware, or software components, or integrated within common or separate hardware, firmware, or software components.

The techniques described in this disclosure may also be embodied or encoded in an article of manufacture including a computer-readable storage medium encoded with instructions. Instructions embedded or encoded in an article of manufacture including a computer-readable storage medium encoded, may cause one or more programmable processors, or other processors, to implement one or more of the techniques described herein, such as when instructions included or encoded in the computer-readable storage medium are executed by the one or more processors. Computer readable storage media may include random access memory (RAM), read only memory (ROM), programmable read only memory (PROM), erasable programmable read only memory (EPROM), electronically erasable programmable read only memory (EEPROM), flash memory, a hard disk, a compact disc ROM (CD-ROM), a floppy disk, a cassette, magnetic media, optical media, or other computer readable media. In some examples, an article of manufacture may include one or more computer-readable storage media.

In some examples, a computer-readable storage medium may include a non-transitory medium. The term "non-transitory" may indicate that the storage medium is not embodied in a carrier wave or a propagated signal. In certain examples, a non-transitory storage medium may store data that can, over time, change (e.g., in RAM or cache).

Various examples of the invention have been described. These and other examples are within the scope of the following claims.

What is claimed is:

1. A method comprising:
   determining, by one or more processors of a computing system included in a vehicle, whether one or more events have occurred that are likely to increase a stress level of an operator of the vehicle;
   determining, by the one or more processors, whether the operator is the only person in the vehicle; and
   responsive to determining that one or more events have occurred that are likely to increase the stress level of the operator of the vehicle and that the operator is the only person in the vehicle, outputting, by the one or more processors and for playback by one or more output devices included in the vehicle, media data likely to reduce the stress level of the operator.

2. The method of claim 1, wherein outputting the media data likely to reduce the stress level of the operator comprises:
   engaging, by the computing system, in a dialog with the operator.

3. The method of claim 1, wherein outputting the media data likely to reduce the stress level of the operator comprises:
   outputting, by the computing system, an indication of an offer to establish a communication session with an operator of another vehicle.

4. The method of claim 1, wherein outputting the media data likely to reduce the stress level of the operator comprises:
   outputting music likely to reduce the stress level of the operator.

5. The method of claim 1, wherein determining whether one or more events have occurred that are likely to increase a stress level of an operator of the vehicle comprises:
   determining that the vehicle is in traffic in response to determining that a speed of the vehicle is less than a threshold speed that is based on a speed limit of a road on which the vehicle is traveling.

6. The method of claim 1, wherein determining whether one or more events have occurred that are likely to increase a stress level of an operator of the vehicle comprises:
   determining that the operator stopped-short in response to determining that the vehicle decelerated at a rate exceeding a deceleration threshold.

7. The method of claim 1, wherein determining whether one or more events have occurred that are likely to increase a stress level of an operator of the vehicle comprises:
   determining that an amount of time for which the operator has been looking for a parking spot is greater than a threshold amount of time.

8. The method of claim 1, wherein determining whether the operator is the only person in the vehicle comprises:
   determining, based on data received from occupancy sensors included in a plurality of seats of the vehicle, that passenger seats of the plurality of seats are not occupied.

9. A vehicle computing system comprising:
   one or more audio output components; and
   one or more processors configured to:
   determine whether one or more events have occurred that are likely to increase a stress level of an operator of a vehicle that includes the vehicle computing system;
   determine whether the operator is the only person in the vehicle; and
   responsive to determining that one or more events have occurred that are likely to increase the stress level of the operator of the vehicle and that the operator is the only person in the vehicle, output, for playback by the one or more audio output components, media data likely to reduce the stress level of the operator.

10. The vehicle computing system of claim 9, wherein, to output the media data likely to reduce the stress level of the operator, the one or more processors are configured to:
    engage in a dialog with the operator.

11. The vehicle computing system of claim 9, wherein, to output the media data likely to reduce the stress level of the operator, the one or more processors are configured to:
    output an indication of an offer to establish a communication session with an operator of another vehicle.

12. The vehicle computing system of claim 9, wherein, to output the media data likely to reduce the stress level of the operator, the one or more processors are configured to:
    output music likely to reduce the stress level of the operator.

13. The vehicle computing system of claim 9, wherein, to determine whether one or more events have occurred that are likely to increase a stress level of an operator of the vehicle, the one or more processors are configured to:
    determine that the vehicle is in traffic in response to determining that a speed of the vehicle is less than a threshold speed that is based on a speed limit of a road on which the vehicle is traveling.

14. The vehicle computing system of claim 9, wherein, to determine whether one or more events have occurred that are likely to increase a stress level of an operator of the vehicle, the one or more processors are configured to:
    determine that the operator stopped-short in response to determining that the vehicle decelerated at a rate exceeding a deceleration threshold.

15. The vehicle computing system of claim 9, wherein, to determine whether one or more events have occurred that are likely to increase a stress level of an operator of the vehicle, the one or more processors are configured to:
  determine that an amount of time for which the operator has been looking for a parking spot is greater than a threshold amount of time.

16. The vehicle computing system of claim 9, wherein the vehicle further comprises occupancy sensors included in a plurality of seats of the vehicle, and wherein, to determine whether the operator is the only person in the vehicle, the one or more processors are configured to:
  determine, based on data received from the occupancy sensors, that passenger seats of the plurality of seats are not occupied.

17. The vehicle computing system of claim 9, wherein the one or more processors are further configured to:
  responsive to determining that the operator is the not only person in the vehicle, refrain from outputting, for playback by the one or more audio output components, the media data likely to reduce the stress level of the operator.

18. A non-transitory computer-readable storage medium storing instructions that, when executed, cause one or more processors of an in-vehicle computing system to:
  determine whether one or more events have occurred that are likely to increase a stress level of an operator of the vehicle;
  determine whether the operator is the only person in the vehicle; and
  responsive to determining that one or more events have occurred that are likely to increase the stress level of the operator of the vehicle and that the operator is the only person in the vehicle, output, for playback by the one or more audio output components, media data likely to reduce the stress level of the operator.

19. The non-transitory computer-readable storage medium of claim 18, wherein the instructions that cause the one or more processors to determine whether one or more events have occurred that are likely to increase a stress level of an operator of the vehicle comprise instructions that cause the one or more processors to:
  determine that the vehicle is in traffic in response to determining that a speed of the vehicle is less than a threshold speed that is based on a speed limit of a road on which the vehicle is traveling.

20. The non-transitory computer-readable storage medium of claim 18, wherein the instructions that cause the one or more processors to determine whether one or more events have occurred that are likely to increase a stress level of an operator of the vehicle comprise instructions that cause the one or more processors to:
  determine that an amount of time for which the operator has been looking for a parking spot is greater than a threshold amount of time.

* * * * *